Patented Sept. 16, 1941

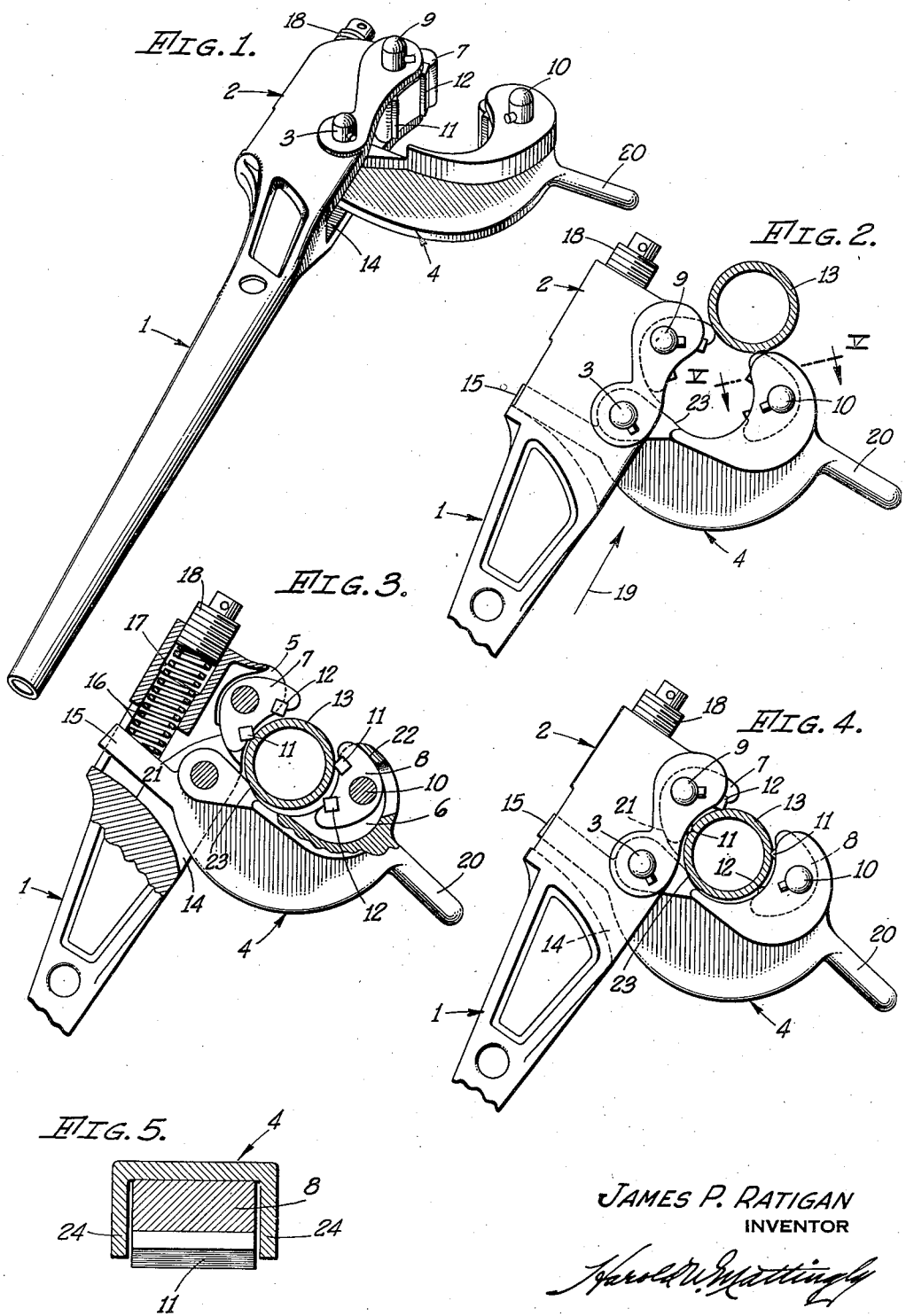

2,256,056

UNITED STATES PATENT OFFICE 2,256,056

TUBING TONG

James P. Ratigan, Los Angeles, Calif.

Application June 19, 1940, Serial No. 341,362

5 Claims. (Cl. 81—91)

My invention relates to tubing tongs and has particular reference to a snap-on type of tong finding particular utility when employed to apply great turning forces to relatively small size pipe or tubing.

In the oil producing industry it is common practice to couple together great numbers of tubing sections to provide a long tubing string, as for example when tubing sections are assembled to provide a string of flow tubing extending from the ground surface to the location of a pump disposed deep within an oil well bore. These tubing sections are usually secured to each other by means of screw threaded joints with the result that whenever it becomes necessary to remove the string of tubing from the well, it also becomes necessary to unscrew each of the joints. Since such tubing strings oftentimes approach ten thousand feet in length, it is desirable that the breaking and making up of such screwed joints be accomplished in as short a time as possible in order to prevent consuming an inordinate amount of time in such connecting and disconnecting operations. It is therefore common practice today to employ snap-on types of tubing tongs, by means of which a firm grip is obtained upon abutting sections of tubing to permit turning forces to be applied to the tubing for the purpose of screwing up or unscrewing the screw threaded joints.

In the present types of tong constructions the grip on the tubing which is required to rotate one length of tubing relative to the other is obtained by a clamping action derived from the turning force which is applied to the handle of the tong. With tongs which are so constructed, the greater the turning force which is applied to the handle the greater the clamping action which is imposed on the tubing so that immense clamping pressures are developed whenever it is necessary to apply great turning forces tending to rotate the tubing. Present tong constructions apply this clamping force to the opposite sides of the tubing with the result that the tubing is oftentimes flattened or distorted by the application of large turning forces to the handles of the tongs. When this occurs, it is necessary to discard such flattened piece of tubing for the reason that it is common practice to insert oil well pumps through the interior of the tubing and if it is flattened even to a small degree the opening in the tubing is so changed in size and shape as to prevent the free passage of the pump therethrough.

It is therefore an object of my invention to provide a tubing tong which permits the application of great turning forces to pipes and tubes without distorting or flattening the cylindrical form thereof.

It is an additional object of my invention to provide a tubing tong of the character set forth in the preceding paragraph which includes a plurality of bits for gripping a tube which are so disposed that the clamping force is applied to the tube at at least three points spaced about the periphery thereof.

It is also an object of my invention to provide a tubing tong of the character set forth in the preceding paragraph which includes an additional auxiliary set of bits so arranged as to be brought into clamping and gripping engagement with the tubing when the turning force applied to the tong exceeds a predetermined value and thus to distribute the forces over a greater number of points of contact about the tubing to thereby lessen the likelihood of collapsing or distorting the tubing when excessive forces are to be applied thereto.

It is an additional object of my invention to provide a tubing tong of the above described character which includes novel features of construction designed to reduce the cost of manufacturing the tongs and to permit repairs and replacement of parts to be more readily made than has hitherto been possible.

Prior tong constructions have been costly to manufacture and expensive to maintain for the reason that all of the many parts employed have been different from each other so that interchanging of parts was not possible. Difficulties have also been experienced in securing the bits of tubing engaging elements within the jaws of the tong so that a costly construction was required in order to make the bits removable or else it was necessary to replace the entire jaws whenever a bit was damaged.

It is therefore an additional object of my invention to provide a tubing tong construction which includes readily replaceable bits or tubing engaging members.

It is a still further object of my invention to provide a tong construction of the character set forth hereinbefore in which the tubing engaging bits are removably secured in bit carriers or pads detachably secured to the jaws.

It is also an object of my invention to provide a tong of the character set forth in the preceding paragraph in which the bit carrier or pads are interchangeable between jaws of the tong.

Prior to my invention it has been necessary to employ a separate tong for each size of tubing to be handled with the result that the investment in tools and the expense of maintaining such tools in good operating condition has been higher than it would have been had a tong been available which was capable of handling more than one size of pipe. Furthermore, the actual size of tubing has been found to vary considerably for the same nominal pipe size with the result that prior tong constructions have either failed to provide an adequate grip upon the tubing in case an under sized piece of tubing were encountered, or have failed to provide a sufficient grip upon the pipe to support their own weight when released.

In use, tubing tongs are snapped on to the tubing and during the screwing up or unscrewing operation a handle of the tong is passed from man to man around a group of four or five men standing in a circle around the tubing being worked upon. This requires that the tong be capable of supporting its own weight when the handle is released so that the tong is not dropped during the time it is being passed from one man to another.

It is accordingly an additional object of my invention to provide a tong construction of the character set forth hereinbefore in which a means is provided for adjusting the force of the clamping grip which is exerted upon the tubing independently of any clamping force derived from a turning force applied to the handle of the tong.

It is also an object of my invention to provide a tong construction of the character set forth in the preceding paragraphs with a set of interchangeable jaws permitting the tong to be used on a plurality of different sizes of pipe.

Other objects and advantages of my invention will be apparent from a study of the following specifications, read in connection with the accompanying drawing, wherein:

Fig. 1 is a perspective view illustrating the appearance and construction of one form of tubing tong of my invention;

Fig. 2 is a plan view illustrating the relative positions of the tong parts at the time the tong is placed against a tubing preparatory to snapping the tong about the tubing;

Fig. 3 is a view similar to Fig. 2 with parts broken away and other parts shown in section to illustrate the construction of the tong and the manner in which the tong grips the tubing when a moderate turning force is applied to the tong;

Fig. 4 is an elevational view similar to Fig. 2 but illustrating the manner in which the grip on the tubing is obtained when a great turning force is applied to the handle of the tong; and Fig. 5 is a fragmentary sectional view taken substantially along the line V—V of Fig. 2 and illustrating the manner in which the tubing engaging bits are retained within the bit carriers.

Referring to the drawing, I have illustrated in Fig. 1 a tubing tong constructed in accordance with the preferred embodiment of my invention. This tong preferably includes a handle member 1 which carries on its outer end an integrally formed handle jaw 2 to which is pivotally secured, as by means of a pivot pin 3, a pivoted jaw 4. Each of the jaws 2 and 4 are recessed as indicated at 5 and 6 to receive bit carriers or pads 7 and 8, the pads 7 and 8 being pivotally secured, respectively, to the jaws 2 and 4 as by means of pivot pins 9 and 10 passed through aligned bores in the jaws and the pads. Each of the pads 7 and 8 are preferably identical and carry a pair of bits or tubing engaging members 11 and 12.

In order that the tong may be placed adjacent a piece of pipe or tubing 13 in the manner illustrated in Fig. 2 and then snapped on to the tubing as is illustrated in Fig. 3, I arrange to urge the pivoted jaw 4 toward a closed position such as that illustrated in Fig. 2. For this purpose the handle jaw may be slotted as indicated at 14 to receive a rearwardly extending tail 15 formed integrally with the body portion of the pivoted jaw 4. The tail 15 is arranged to be engaged by the lower end of a strong compression spring 16 which is received within a longitudinally extending bore 17 formed in the outermost end of the handle jaw 2. The bore 17 may be threaded at its upper end to receive an adjusting plug 18 which may be screwed into the bore 17 to cause the spring 16 to exert more or less pressure as desired upon the tail 15.

The pressure which is exerted by the spring 16 upon the tail 15 tends to hold the pivoted jaw 4 in a closed position such as that illustrated in Fig. 2. If, however, the tong be forcibly pushed in the direction indicated by arrow 19 in Fig. 2, the spreading force which is thereby exerted between the pivoted jaw 4 and the handle jaw 2 will overcome the force of the spring 16 and cause the jaws to move to a relatively open position and permit them to pass around the tubing 13. This operation may be facilitated as by providing on the pivoted jaw 4 a short handle member 20 which may be grasped by an operator for the purpose of moving the jaw 4 toward an open position at the time the jaws are passed around the tubing 13. In either event, the adjusting plug 18 is so adjusted as to cause the force which is exerted by the spring 16 to be sufficiently great to grip the tubing with enough force to sustain the weight of the tong when the handle is released.

Reference to Fig. 3 will indicate that at the time the tong is snapped about the tubing 13 only the bits 11 are engaged with the tubing, the bits 12 being disposed in close spaced relation to the wall of the tubing 13. This is achieved by forming the recesses 5 and 6 with stop portions 21 and 22 so disposed as to limit the movement of the bits 11 away from the tubing 13. It will also be observed that when the tubing 13 is moved into the tubing receiving opening defined by the jaws 2 and 4 sufficiently far to bear against an inner heel surface 23 of the pivoted jaw 4, the bits 11 will engage the tubing at points disposed beyond a diameter of the tubing. This condition therefore obtains when a moderate turning force is applied to the handle 1 so that the pipe is gripped between the bits 11 and the heel surface 23 with the result that the clamping force which is applied to the tubing 13 is applied at three points spaced relatively uniformly about the periphery of the tubing. Thus there is developed very little, if any, tendency to collapse or flatten the tubing so that relatively large turning forces may be applied to the handle 1 without damaging the tubing.

As more and more turning force is applied to the handle, the bits 11 bite deeper and deeper into the material of which the tubing 13 is formed and simultaneously the jaw 4 and the pivot pin 3 therefor tend to spring slightly, this combined action causing the auxiliary bits 12 to be also brought into engagement with the surface of the tubing 13 as is indicated in Fig. 4. Reference to this figure will clearly show that when a relatively great turning force is applied to the handle 1, the tubing 13 is gripped by four tubing engaging bits and this gripping action is obtained by a clamping force which is applied to the tubing at five points (one of the points being the heel surface 23), which five points are spaced substantially uniformly about the periphery of the tubing. This uniform distribution of the clamping force relative to the periphery of the tubing permits enormous turning forces to be applied to the handle 1 without distorting or flattening the tubing 13.

Reference has been had hereinbefore to the bits 11 and 12 being mounted in the pads or bit carriers 7 and 8. This mounting is preferably achieved by forming the pads 7 of cast material and by forming in the pads at the time the pads are cast square or other similarly shaped recesses of non-circular cross section for receiving the bits. These recesses may be made slightly smaller than the bits 11 and 12, if desired, thus permitting the bits to be forcibly driven into the somewhat smaller recesses provided therefor. This is not necessary, however, since the bits cannot escape from the recesses once the pads are installed in the jaws 2 and 4.

Reference to Fig. 5 will clearly indicate that skirt portions 24 of the jaws 2 and 4 which are defined by the body of these jaws and the recesses 5 and 6 which are formed therein overlie the ends of the bits 11 and 12 when the pads are installed in the recesses so that the bits are prevented from moving lengthwise within their recesses. This construction permits the bits to be readily replaced with new bits by merely removing the pivot pins 9 or 10 to permit the pad 7 or 8 to be removed from the jaw. Removal of the pad then permits the bit to be slid lengthwise out of the recess within which it is received and a new bit to be as easily re-inserted.

Attention is also called to the fact that the pads 7 and 8 are preferably identical so that no care need be observed in assembling the tong, either of the pads operating equally well in either of the recesses 5 or 6. This also has the advantage of reducing the number of replacement parts which must be kept in stock for maintaining such tongs in good operative condition.

It will also be appreciated that removal of the pivot pin 3 permits the pivoted jaw 4 to be readily dis-associated from the handle 1 and handle jaw 2. When the pivoted jaw 4 is removed in this fashion, the compression of the spring 16 may be relaxed as by unscrewing the adjusting plug 18 so that a pivoted jaw 4 of a different size may be substituted for the pivoted jaw 4 just removed. This construction therefore permits the tong of my invention to be readily converted for use on one size of tubing to use on tubing of a different size.

From the foregoing it will be observed that I have provided a tubing tong construction which permits the tong to be arranged for use on tubing of different sizes and that when so employed, the tong will operate to apply to the tubing enormous turning forces without collapsing, distorting or flattening the tubing.

It will also be observed that the tong of my invention permits the clamping force which is applied to the pipe by the spring 16 to be adjusted to substantially any desired value so that once the tong is snapped on the tubing, it will grip the tubing with sufficient force to support its own weight.

Attention is also called to the fact that the construction above described permits the tong to be readily attached to or detached from a string of tubing, it being only necessary to push the tong on the tubing in order to attach it thereto and it being only necessary to grip the handle 1 and the handle 20 and exert an opening force on the pivoted jaw 4 to permit the removal of the tong from the tubing.

While I have shown and described the preferred embodiment of my invention, I do not desire to be limited to any of the details of construction shown or described herein, except as defined in the appended claims.

I claim:

1. In a tubing tong, the combination of: a handle jaw; a pivoted jaw having a curved inner surface facing said handle jaw hingedly secured to said handle jaw for movement toward and away therefrom; a tubing engaging bit secured to the inner surfaces of each of said jaws in such relative locations that one of said bits lies beyond a diametrical line passing through the other of said bits and the center of a tubing placed between said jaws and engaged with said curved surface; an auxiliary tubing engaging bit carried by each of said jaws in spaced relation to said first-named bits; and means securing said auxiliary bits against movement toward said tubing relative to said first-named bits beyond a position disposing said auxiliary bits in close spaced relation to said tubing when said first-named bits are engaged therewith, whereby said auxiliary bits are engageable with said tubing when said first-named bits are forced into the surface of said tubing a predetermined distance.

2. In a tubing tong, the combination of: a handle jaw; a pivoted jaw hingedly secured to said handle jaw for movement toward and away therefrom, each of said jaws having a recess formed in the inwardly directed faces thereof; a bit carrier disposed in each of said recesses and pivotally secured to said jaws; a plurality of bits secured to each of said bit carriers in such spaced relation to each other as to be spaced about the periphery of a tubing placed between said jaws; and stop means on each of said jaws for engaging the carrier secured thereto and arresting the pivotal movement of said carrier in such location that a part only of said plurality of bits are normally engageable with said tubing.

3. In a tubing tong, the combination of: a handle; a handle jaw carried on the end of said handle; a pivoted jaw hingedly secured to said handle jaw for limited movement toward and away therefrom, said handle jaw and said pivoted jaw defining a tubing receiving opening lying between said jaws; a main tubing engaging bit carried by each of said jaws in such relative locations as to extend into said opening and embrace therewithin more than one-half the circumference of a tubing received therein and abutting one of said jaws at a point spaced from said bits, whereby a turning force applied to said handle clamps said tubing at three points between said bits and between said bits and said point on one of said jaws; an auxiliary tubing engaging bit carried by each of said jaws in spaced relation to said main bits; and means securing said auxiliary bits against movement toward said tubing relative to said first-named bits beyond a position disposing said auxiliary bits in close spaced relation to said tubing when said main bits are engaged therewith, whereby said auxiliary bits are movable into engagement with said tubing by the application to said handle of a turning force of predetermined magnitude sufficient to cause penetration of said first-named bits into said tubing to thereby clamp said tubing at at least five points spaced about the periphery of said tubing.

4. In a tubing tong, the combination of: a handle jaw; a pivoted jaw hingedly secured to said handle jaw for pivotal movement toward and away from said handle jaw; a bit carrier for each jaw; a plurality of tubing engaging bits secured in fixed positions on each carrier; means mounting said carriers for pivotal movement about axes disposed parallel to and laterally offset from the axis of a tubing placed between said jaws; and means on each of said jaws for limiting the pivotal movement of said carriers in one direction to positions disposing a part of said bits in engagement with said tubing and the remainder of said bits spaced from said tubing a short distance.

5. In a tubing tong, the combination of: a handle jaw; a pivoted jaw; hinge means securing said pivoted jaw to said handle jaw for pivotal movement toward and away from said handle jaw; a bit carrier for each jaw; an inner and an outer tubing engaging bit secured in fixed positions on each carrier; pivot means mounting said carriers for pivotal movement about axes disposed between said bits and parallel to the axis of a tubing placed between said jaws; stop means on said handle jaw disposed between said hinge means and the carrier pivot means for said handle jaw in a position to engage and arrest pivotal movement of said carrier toward said hinge means in a position disposing said inner bit in engagement with said tubing and said outer bit spaced from said tubing; and a stop means on said pivoted jaw disposed outwardly of said hinge means beyond the carrier pivot means for said pivoted jaw in a position to engage and arrest pivotal movement of said carrier away from said hinge means in a position disposing said outer bit in engagement with said tubing and said inner bit spaced therefrom.

JAMES P. RATIGAN.